219-146.32 SR SEARCH ROOM
OR RE 26,611 )C

June 24, 1969 G. E. CLAUSSEN Re. 26,611

WELDING ELECTRODES

Original Filed July 20, 1964

INVENTOR
GERARD E. CLAUSSEN
BY
Marechal, Biebel, French & Bugg
ATTORNEYS

United States Patent Office

Re. 26,611
Reissued June 24, 1969

26,611
WELDING ELECTRODES

Gerard E. Claussen, Phoenix, Ariz., assignor to Hobart Brothers Company, Troy, Ohio, a corporation of Ohio Original No. 3,365,565, dated Jan. 23, 1968, Ser. No. 383,767, July 20, 1964. Application for reissue July 18, 1968, Ser. No. 753,806
Int. Cl. B23k *35/22*
U.S. Cl. 219—146 5 Claims

Matter enclosed in heavy brackets [ ] appears in the original patent but forms no part of this reissue specification; matter printed in italics indicates the additions made by reissue.

ABSTRACT OF THE DISCLOSURE

A small diameter cored wire electrode for use in a gas shielded environment for applying hard facings to cutting implements includes a mild steel sheath and a core containing a mixture of metallic powder including ferrochromium, ferrosilicon and a powder selected from the group consisting of manganese and ferromanganese. The small diameter of the electrode permits depositing hard facings on vertical, horizontal and overhead surfaces.

This invention relates to the art of electric welding and specifically to welding electrodes to be used in applying hard facings to cutting tools and similar cutting implements and apparatus. In such application a high Brinell is necessary.

One of the objects of the invention is the provision of an improved cored electrode for the application of hard facings.

A further object of the invention is the provision of a cored electrode for the application of extremely small deposits on cutting tools, implements and apparatus.

A further object of the invention is the provision of a cored electrode for the application of a hard facing in all positions of welding.

A further object of the invention is the provision of methods of forming the above-described electrodes.

Other objects, advantages, and features of the invention will be apparent from the following description, the accompanying drawing and the appended claims.

In the drawing—

The electrode disclosed therein is of value in providing hard facings to cutting tools, implements and apparatus and to other articles where hard facings are required or denied.

Figure 1:
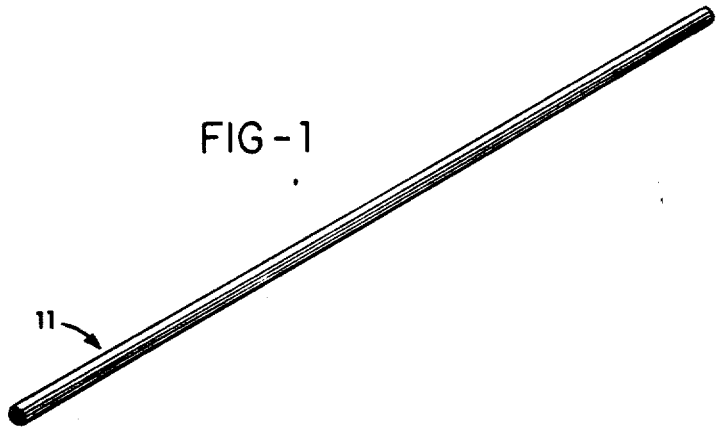
FIG. 1 is a showing in perspective of an electrode formed by bending a strip of mild steel into substantially an elongated cylinder and filling the interior of the cylinder with appropriate metal powders.
Figure 2:
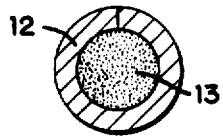
FIG. 2 is a view in cross-section of the electrode of FIG. 1 shown on a greatly enlarged scale.
Figure 3:
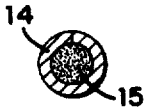
FIG. 3 is a view in cross-section similar to FIG. 2 showing the electrode after it has been drawn to a reduced diameter.

Referring to the drawing, the core electrode 11 disclosed in FIGS. 1 and 2 has a sheath 12 which encloses a core 13. When this electrode 11 is drawn to reduce the diameter thereof, the thickness of the sheath is substantially reduced so as to form the relatively thin-walled sheath 14. The space for the core is reduced also so that the core 15 has a relatively small diameter.

For certain uses the compositions of the metal powders when combined with the composition of the sheath should be such that the carbon of the deposit should be in the range of 0.25% to 0.70% and the chromium in the range of 3.5% to 10.0%. For other purposes the composition of the metal powders when combined with the composition of the sheath should be such that the carbon of the deposit should be in the range of 2.0% to 3.5% and the chromium in the range of 18.0% to 26.0%. The composition must also contain sufficient managanese and silicon to provide weldability with $CO_2$ or oxygen mixtures as shielding gases. For this purpose it is desired that there be provided in the composition manganese of from 0.4% to 1.5% and silicon of from 0.3% to 0.8%.

The sheath 12 disclosed in FIGS. 1 and 2 is formed from a strip of mild steel having a suitable width and thickness. For example only, the strip may have a width of 0.380 inch and a thickness of 0.030 inch. The strip is bent or rolled and formed to a hollow substantially cylindrical tube having an external and internal diameter depending on the original width and thickness and the forming operations applied thereto. The 0.380-inch width, 0.030-inch thick strip may for instance be rolled to form a tube having an external diameter of about 0.12 inch or about ⅛-inch. It is then filled with the desired composition of metal powders and thereafter is rolled and formed to the smaller size desired as for example, to a core electrode having an external diameter of 0.045 inch. Alternatively, the 0.380-inch width, 0.030-inch thick strip may be rolled and then drawn to form a tube having a smaller diameter as for example 3/30 inch (or 0.09375 inch). Then it may be filled with the composition of metal powders and thereafter drawn again to reduce it in size so that the external diameter is reduced to 0.030 inch.

Other size strips may obviously be used in many different embodiments to form tubes having different diameters. For example, 0.512-inch wide strips having a thickness of 0.042 inch, 0.775-inch wide strips having a thickness of 0.025 inch, and strips having a width of 0.190 inch and thickness of 0.016 inch have also been used. After forming the tubes, especially if they are relatively large-sized tubes, they are often preliminarily drawn to small diameters. Then, after being filled with compositions of metallic powders, the cored electrodes (whether they have previously been drawn or not) are drawn (or redrawn) to a smaller diameter thus decreasing both the outside diameter of the cored electrode and the thickness of the extended walls thereof.

The sheath consists, as stated, of a mild steel strip. One such mild steel strip is designated as a 1010 steel strip, and has a composition of from 0.03 to 0.10% carbon, 0.30 to 0.60% manganese, from 0.0% to 0.04% phosphorus, and from 0.0 to 0.05% sulfur, and approximately 0.01% silicon. These percentages can be varied reasonably but the above is one useful analysis.

The sheath specified above was filled during the manufacturing and forming process with the core material and, when completely filled and closed, the cored electrode consisted of a cylindrical tube and core. Then the tube and core (i.e. the cored electrode) was drawn so that the outside diameter and wall thickness was substantially reduced. The core may consist of from 16% to 40% of the total weight of the electrode.

Following are examples of the preparation of electrodes prepared according to the invention:

EXAMPLE I

A laboratory formula was prepared for use in a cored electrode consisting of the following:

| | Percent by weight |
|---|---|
| Iron powder | 29.2 |
| Ferrochromium | 39.5 |
| Ferromanganese | 8.7 |
| Ferrosilicon | 7.3 |
| High carbon iron | 15.3 |

The mix was made the core of a cored electrode formed from a mild steel strip 0.512" x 0.042". The powders of the formula were blended five minutes before forming. The powders made up 20.6% of the weight of the finished electrode.

The resulting cored electrode was drawn to 1/16-inch diameter.

A three-layer weld pad was deposited with the electrode at 300 amperes, DCR, 30 volts, 25 CFH $CO_2$ on a plate of mild steel 3/4-inch thick. The hardness was:

| | Brinell |
|---|---|
| First layer | 514 |
| Second layer | 514 |
| Third layer | 477 |

The deposit had the following chemical composition:

| | Percent |
|---|---|
| Carbon | 0.44 |
| Manganese | 1.15 |

The electrode was satisfactory for depositing on vertical, horizontal and overhead surfaces.

EXAMPLE II

A laboratory formula was prepared for use in a cored electrode consisting of the following:

| | Percent by weight |
|---|---|
| Iron powder | 29.2 |
| Ferrochromium | 39.5 |
| Ferromanganese | 8.7 |
| Ferrosilicon | 7.3 |
| High carbon iron | 15.3 |

The mix was made the core of a cored electrode formed from a mild steel strip 0.380" x 0.030". The powders of the formula were blended five minutes before forming.

The resulting cored electrode was drawn to 0.030" diameter.

Hard facing experiments showed this electrode was capable of depositing metal of substantially the same composition and hardness as in Example I, using 90 amperes on the 0.030" electrode, and a bead 1/8-inch wide was deposited accurately and uniformly on the cutting edge of a tool.

EXAMPLE III

A laboratory formula was prepared consisting of the following:

| | Percent by weight |
|---|---|
| Ferrochromium | [1] 90.0 |
| Manganese | 4.0 |
| Ferromolybdenum | 2.0 |
| Ferrosilicon | 4.0 |

[1] This contained about 8.0% carbon.

The mixture was made the core of a cored electrode formed from a mild steel strip 0.275" x 0.012". The powders made up 36.6% of the weight of the finished electrode, which was drawn to 0.045-inch diameter.

A weld pad was deposited with the 0.045" electrode at 100 amperes DCR, 21 volts, 15 CFH $CO_2$. The deposit had the following hardness and composition.

| | | |
|---|---|---|
| Brinell hardness | | 444 |
| Carbon | percent by weight | 2.4 |
| Manganese | do | 0.87 |
| Silicon | do | 0.52 |
| Chromium | do | 20.2 |
| Molybdenum | do | 0.43 |

While several specific forms of electrodes and specific compositions of matter and several specific methods have been described herein, and while these specific forms constitute preferred embodiments of the inventions disclosed herein, it is to be understood that the invention is not limited to these precise forms, components and methods, and that changes may be made without departing from the scope of the invention which is defined in the appended claims.

What is claimed is:

1. A cored electrode that can be used in all positions of welding and for making extremely small deposits which comprises:
   - a substantially cylindrical steel sheath having an overall diameter of from 0.030" to 0.062" [and a wall thickness of from 0.030" to 0.010"] and;
   - a core [for], *comprising 16% to 40% of the total weight of the electrode, positioned in* said cylindrical sheath [comprising] *with* a mixture of metallic powders including:
     - ferrochromium
     - ferrosilicon
   - and a powder selected from the group consisting of manganese and ferromanganese.

2. A cored electrode that can be used in all positions of welding and for making extremely small deposits which comprises:
   - a substantially cylindrical steel sheath having an overall diameter of from 0.030" to 0.062" [and a wall thickness from 0.030" to 0.010"] and;
   - a core [for], *comprising 16% to 40% of the total weight of the electrode, positioned in* said cylindrical sheath [comprising] *with* a mixture of metallic powders including:
     - ferrochromium—90.0%
     - ferrosilicon—4.0%
     - ferromolybdenum—2%
   - and a powder selected from the group consisting of manganese and ferromanganese—4%.

3. A cored electrode that can be used in all positions of welding and for making extremely small deposits which comprises:
   - a substantially cylindrical steel sheath having an overall diameter of [1/16 inch] *from 0.030" to 0.062"*; and
   - a core comprising from 16% to 40% of the total weight of the electrode positioned in said cylindrical sheath with a mixture of metallic powders comprising:
     - iron powder—29.2%
     - ferrochromium—39.5%
     - ferromanganese—8.7%
     - ferrosilicon—7.3%
     - high carbon iron—15.3%.

4. A cored electrode that can be used in all positions of welding and for making extremely small deposits which comprises:
   - a substantially cylindrical steel sheath having an overall diameter of 0.030 inch and;
   - a core comprising from 16% to 40% of the total weight of the electrode positioned in said cylindrical sheath with a mixture of metallic powders comprising:
     - iron powder—29.2%
     - ferrochromium—39.5%
     - ferromanganese—8.7%
     - ferrosilicon—7.3%
     - high carbon iron—15.3%.

5. A cored electrode that can be used in all positions of welding and for making extremely small deposits which comprises:

a substantially cylindrical steel sheath having an overall diameter of 0.045 inch; and a core comprising from 16% to 40% of the total weight of the electrode positioned in said cylindrical sheath with a mixture of metallic powders comprising:

ferrochromium—90.0%
ferrosilicon—4.0%
manganese—4.0%
ferromolybdenum—2.0% where the ferrochromium contains—8% carbon.

References Cited

The following references, cited by the Examiner, are of record in the patented file of this patent or the original patent.

UNITED STATES PATENTS

| | | | |
|---|---|---|---|
| 1,531,828 | 3/1925 | Armor | 219—146 |
| 1,629,748 | 5/1927 | Stoody | 219—146 |
| 2,291,482 | 7/1942 | McLott | 219—146 |
| 2,408,620 | 10/1946 | Friedlander | 219—146 |
| 2,429,175 | 10/1947 | Willigen | 219—146 |
| 3,101,405 | 8/1963 | Wilcox | 219—146 |
| 3,175,074 | 3/1965 | Culbertson | 219—146 |
| 3,221,136 | 11/1965 | Freeth et al. | 219—146 |

OTHER REFERENCES

"Ferroalloys," Am. Iron and Steel Inst., 350 5th Ave., New York, N.Y., September 1940, pp. 1–8.

JOSEPH V. TRUHE, *Primary Examiner.*

B. A. STEIN, *Assistant Examiner.*

U.S. Cl. X.R.

117—202; 148—24